Jan. 26, 1965  J. KIRSCH  3,167,029
SHOCK-CUSHIONING DEVICE
Filed Sept. 26, 1961  2 Sheets-Sheet 1
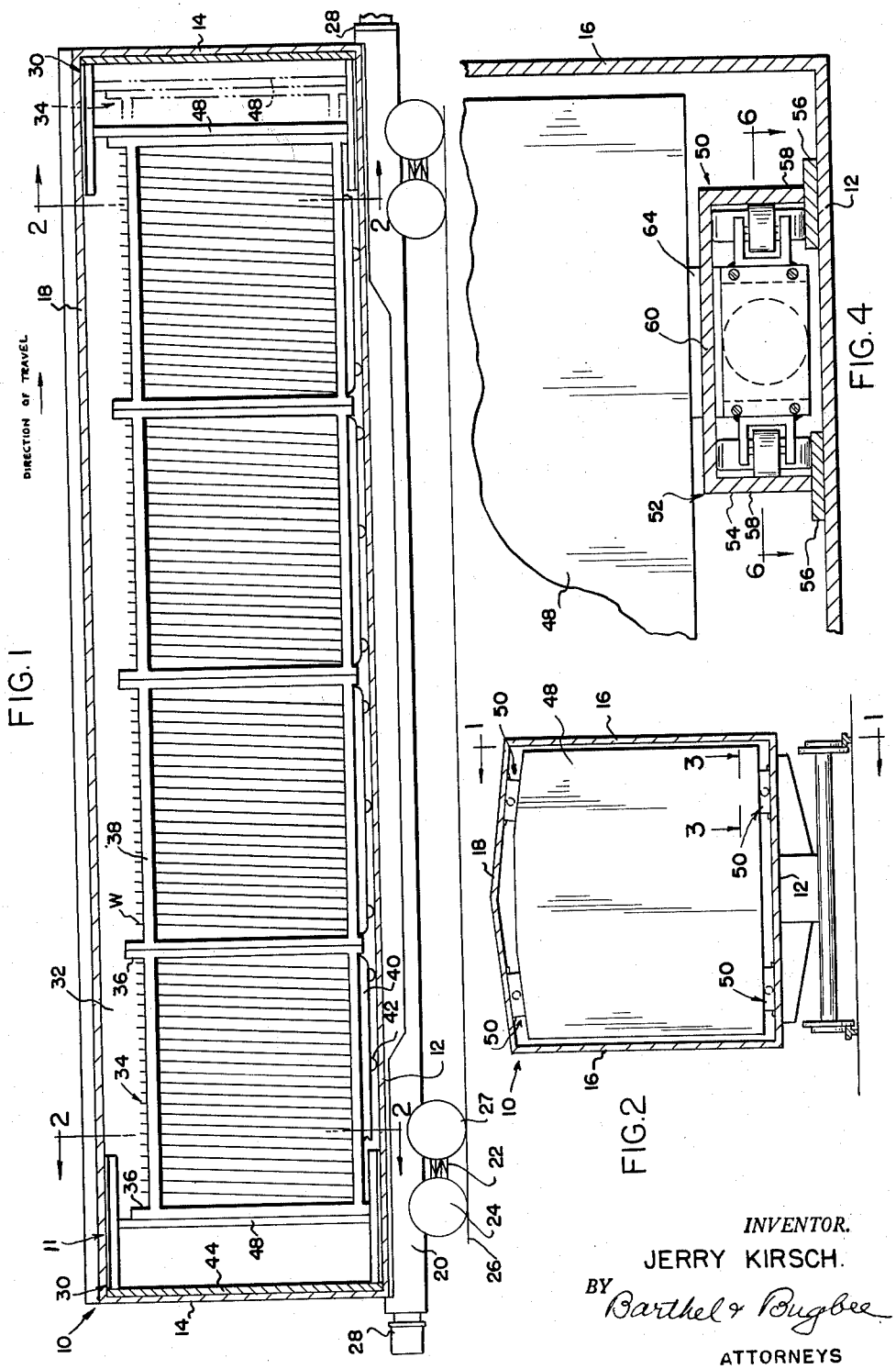
INVENTOR.
JERRY KIRSCH.
BY Barthel & Bugbee
ATTORNEYS Jan. 26, 1965  J. KIRSCH  3,167,029
SHOCK-CUSHIONING DEVICE
Filed Sept. 26, 1961  2 Sheets-Sheet 2
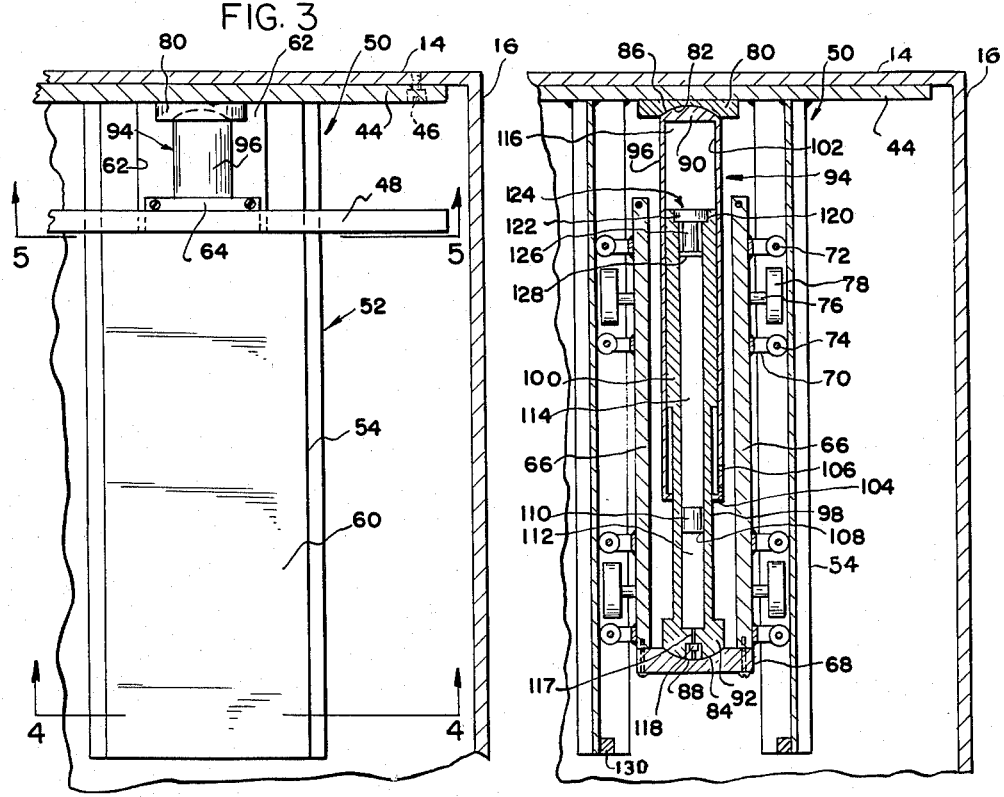
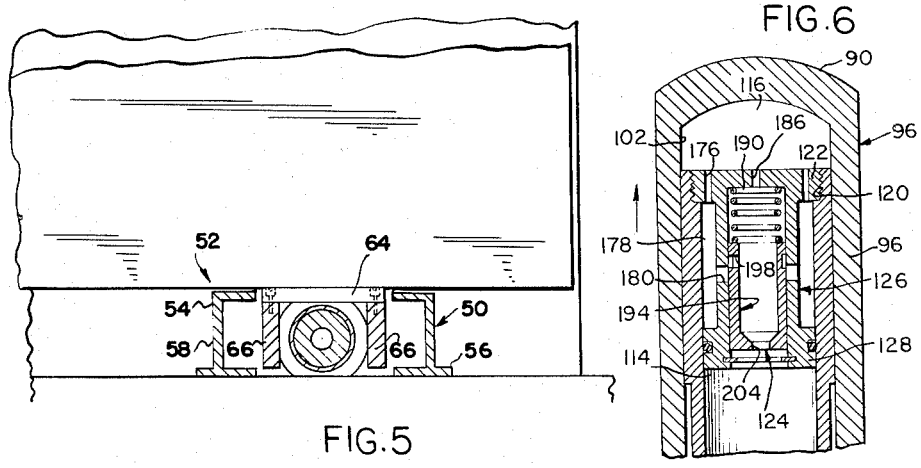
INVENTOR.
JERRY KIRSCH.
BY Barthel & Bugbee
ATTORNEYS

United States Patent Office 3,167,029
Patented Jan. 26, 1965

3,167,029
SHOCK-CUSHIONING DEVICE
Jerry Kirsch, 3946 Bishop Road, Detroit, Mich.
Filed Sept. 26, 1961, Ser. No. 140,761
7 Claims. (Cl. 105—374)

This invention relates to cargo vehicles and, in particular, to cushioning means for the cargo carried by vehicles such as railroad freight cars, highway trucks, trailers and semi-trailers, and freight-carrying aircraft.

Hitherto, much damage has occurred to cargo being shipped in cargo-carrying vehicles, such as railroad box cars, highway trucks and semi-trailers, brought about by the forward shifting of the cargo when the vehicle is suddenly braked or brought to a halt. The momentum possessed by the cargo, along with the often fragile nature of the cargo itself, has set up powerful forces during deceleration of the vehicle which has brought about such damage. This damage has been a source of large loss to transport companies and shippers even where the shippers have gone to the extra expense of unusually careful packing and cushioning by rubber bumpers or rubber spacers. Such damage has occurred in the shipment, for example, of sheet metal automobile parts, such as automobile body panels and floor pans, even though special racks have been installed in the freight cars for holding the articles, and rubber bumpers and spacers used to separate the sheet metal parts. Such sheet metal, however, is highly vulnerable to the great forces developed during acceleration and deceleration. Because of the great expense involved, transportation companies, such as railroad and trucking companies, are averse to building special vehicles for cushioning the shocks of deceleration and have largely placed the responsibility on the shipper for using cushioned packing means and methods. The weights involved, however, are tremendous, and, for example, the combined weight of a railroaod box car and its load of one type of sheet metal automobile parts runs to around 169,000 pounds. The present invention has provided means for solving this cushioning problem and protecting the cargo from damage by these deceleration forces, as stated more fully in the objects set forth below.

Accordingly, one object of this invention is to provide a cushioned vehicle load holder adapted to be installed in an existing cargo vehicle, such as a railway freight car, highway truck, trailer, semi-trailer or cargo aircraft, and which permits the cargo to move under a restraining cushioning action that gradually brings the cargo to a halt without damage even though the vehicle itself has been so rapidly decelerated or brought to a halt that damage would otherwise occur.

Another object is to provide a cushioned vehicle load holder of the foregoing character which does not require the provision of a special vehicle for its use, but which can be installed in a standard cargo carrier, such as a railroad box car, highway truck, trailer, semi-trailer or cargo aircraft, and which may quickly and easily be removed therefrom and transferred, if desired, to another vehicle.

Another object is to provide a cushioned vehicle load holder of the foregoing character wherein deceleration of the cargo moving relatively to the vehicle is caused to take place at a controlled rate well below the rate of deceleration which would otherwise cause damage to the cargo, notwithstanding the much more rapid rate of deceleration of the vehicle itself.

Another object is to provide a cushioned vehicle load holder of the foregoing character wherein hydro-pneumatic cushioning cylinders are employed to effect the controlled deceleration and cushioning of the cargo while the cargo moves relatively to the more rapidly decelerating vehicle, or to effect controlled acceleration and cushioning of the cargo while it is moving relatively to the more rapidly accelerating vehicle.

Other objects and advantages of the invention will become apparent during the course of the following description of the accompanying drawings, wherein:

FIGURE 1 is a vertical longitudinal section through a cargo vehicle, such as a railroad freight car, taken along the line 1—1 in FIGURE 2, showing a cushioned vehicle load holder, according to one form of the invention, in side elevation;

FIGURE 2 is a cross-section taken along the line 2—2 in FIGURE 1;

FIGURE 3 is an enlarged fragmentary top plan view of one of the cushioning devices, taken along the line 3—3 in FIGURE 2;

FIGURE 4 is a vertical cross-section taken along the line 4—4 in FIGURE 3 near the inner end of the cushioning device;

FIGURE 5 is a vertical cross-section taken along the line 5—5 in FIGURE 3, near the outer end of the cushioning device;

FIGURE 6 is a horizontal section taken along the line 6—6 in FIGURE 4; and

FIGURE 7 is an enlarged central vertical section through the flow control valve and adjacent structure in the upper central portion of FIGURE 6.

Referring to the drawings in detail, FIGURE 1 shows a car or vehicle, generally designated 10, equipped with a cushioned vehicle load holder, generally designated 11, according to one form of the invention. The cargo vehicle 10 is shown diagrammatically as a standard railroad freight car or box car, conventional details being omitted in order to simplify the showing of the invention. It will be understood that while the vehicle 10 is shown as a railroad freight car, the invention is equally applicable to other forms of cargo-carrying vehicles, such as highway trucks, trailers, semi-trailers and cargo aircraft. The vehicle 10 is equipped with the usual floor or bed 12, fixed end walls 14, side walls 16 and a roof 18. The floor 12 rests upon the usual frame 20 to which in turn the so-called trucks 22 carrying the traction wheels 24 are connected, together with the usual spring (not shown). The wheels 24, of course, engage the usual track 26. Couplings 28 of a conventional type are connected to the opposite ends of the frame 20. In the case of a highway semi-trailer, one of the coupling devices 28 is replaced by a conventional fifth wheel.

Mounted within the vehicle 10 at each end thereof is a load deceleration cushioning installation, generally designated 30. Both cushioning installations 30 are of similar construction, even though oppositely-facing within the vehicle cargo receiving body or compartment 32, hence a single description will suffice for both. Mounted within the vehicle cargo compartment 32 are a plurality of multiple cargo carriers or racks, generally designated 34, upon which the articles or workpieces W constituting the cargo are carried. The articles W are shown, for convenience of illustration, as spaced sheet metal plates, but it will be understood that the articles W may comprise any other type of article which is capable of being transported by such cargo vehicles 10. The cargo holders or racks 34, as their names indicate, are in the form of open frames with vertical end members 36 interconnected by longitudinal side members 38. Each of the racks 34 rests upon a platform or pallet 40 adapted to be conveniently engaged by the fork of a fork lift truck (not shown) for convenience in loading and unloading the cargo vehicle 10. Each platform or pallet 40 is equipped with casters or rollers 42 which in the case of a modern metal freight car having a metal floor, roll directly upon that floor. In the case of older wooden box cars or metal box cars having a wooden floor, rails (not shown) are installed upon which the rollers 42 roll. This arrangement enables the cargo carriers 34 to move freely back and forth within the cargo compartment 32 relatively to the floor 12 thereof.

Each cushioning installation 30 (FIGURES 1 and 3) includes a stationary end frame 44 conveniently made of fabricated metal channel or angle members welded to one another and secured in any suitable manner to the adjacent end wall 14 of the vehicle 10, as by bolts 46. Associated with each stationary end frame 44 and disposed in longitudinally-spaced relationship therewith, is a movable end frame 48 of similar construction adapted to engage the adjacent end member 36 of the nearest cargo carrier 34. Mounted at approximately the four corners of each cushioning installation 30 and interconnecting the stationary and movable end frames 44 and 48 thereof are four cushioning devices, generally designated 50, of similar construction to one another and shown in detail in FIGURES 3 to 6 inclusive.

Each cushioning device 50 includes a guideway, generally designated 52, including a channel member 54 having attachment plates 56 secured, as by welding, to the free edges of the side walls of flanges 58 of the channel member 54, the side walls or flanges 58 being interconnected by the channel web or connecting wall 60. The lower channel members 54 of the guideways 52 face downward and have their attachment plates 56 bolted or otherwise secured to the vehicle floor 12 (FIGURE 4), whereas the channel members 54 of the upper cushioning devices 50 face upward and have their attachment plates 56 bolted or otherwise secured to the roof 18 of the vehicle 10 (FIGURE 2). Each cushioning device 50, however, is otherwise of similar construction, hence a single description will suffice for all. Each guideway 52 is welded or otherwise secured at its outer end to the adjacent end frame 44 (FIGURE 6). Near the outer end of each guideway 52, the connecting wall or web 60 of each channel member 54 is cut away as at 62 to provide a rectangular opening, which is at least as long as the length of stroke of the movable end frame 48 relatively to the stationary end frame 44 (FIGURE 3).

Bolted or otherwise secured to the movable end frame 48 near each corner thereof is a bracket 64 which extends beyond the edge of the movable end frame 48 into the opening 62 at the inner end thereof. Bolted or otherwise secured to the bottom of each bracket 64 at its opposite ends are the outer ends of two laterally-spaced parallel bars 66 (FIGURES 5 and 6), the inner ends of which are bolted or otherwise secured to a cross plate or cross head 68 interconnecting their inner ends (FIGURE 6). Secured to each bar 66 at spaced locations therealong are outwardly-projecting brackets 70 carrying the vertical axles 72 of vertical rollers 74 which engage the inner sides of the channel flanges or side walls 58 to reduce friction and guide the bars 66 and their connected parts during the reciprocation thereof. Also secured to the bars 66 at longitudinally-spaced locations are the horizontal axles 76 projecting laterally therefrom and carrying horizontal rollers 78 which engage either the attachment plates 56 when mounted below the movable end frames 48, or the web 60 in the cushioning devices 50 mounted above the movable end frames 48.

Bolted or otherwise secured to each stationary end frame 44 approximately midway between the flanges or side walls 58 of the channel members 54 of the guideways 52 (FIGURE 6) is an abutment or thrust plate 80 aligned with its respective cross head 68. Each abutment plate 80 and its corresponding cross head 68 are provided with spherical concave recesses 82 and 84 respectively (FIGURE 6) self-aligningly engaged by the corresponding convex end surfaces 86 and 88 of the cylinder head 90 and piston rod end or head 92 respectively of a hydropneumatic reciprocatory cushioning motor, generally designated 94. The cylinder head 90 forms the outer end of a cylinder 96, whereas the piston rod end 92 forms the forward end of a hollow main piston rod 98 connected to a hollow main piston head 100 reciprocably mounted within the cylinder bore 102 of the cylinder 96. The cylinder 96 near its open end 104 through which the piston rod 98 passes is provided with a vent port 106.

The hollow piston rod 98 is provided with a longitudinal bore 108 in which is reciprocably mounted a free or floating auxiliary piston 110 dividing the piston rod bore 108 into a pneumatic chamber 112 filled with a suitable compressed gas, such as compressed nitrogen, and an intermediate or middle hydraulic chamber 114 adapted to be filled with and at least partially emptied of a suitable hydraulic fluid, such as oil. The end of the cylinder bore 102 adjacent the head 90 contains a main hydraulic chamber 116. The piston rod end 92 is provided with a passageway 117 closed by a pneumatic charging fitting 118 containing a valve (not shown) similar to that of a pneumatic tire filling valve and provided for the purpose of charging the pneumatic chamber 112 with the compressed gas just mentioned.

The bore 108 of the hollow piston rod 98 at the end opposite the piston rod head 92 is provided with a counterbore 120 into which is threaded or otherwise secured the correspondingly-threaded flange 122 of a flow control valve, generally designated 124. The flow control valve 124 contains a compression spring 190 and a spring-pressed tubular reciprocatory valve member 194 (FIGURE 7) has a constantly open end port 204 and a wall port 198 which opens and closes wall ports 180 in the valve casing 126 between the flanges 122 and 128 thereof, the flange 122 having longitudinal ports 176 connecting the space 178 between the flanges 122 and 128 to the main hydraulic chamber 116. The flow control valve 124 is of any suitable type responsive to the attainment of a predetermined pressure in the intermediate hydraulic chamber 114 to open and discharge hydraulic fluid therefrom into the main chamber 116, the valve 124 containing a small "through" passageway 186 permitting small quantities of hydraulic fluid to flow in opposite directions between the chambers 114 and 116. Such a valve 124 is disclosed and claimed in combination with the hydropneumatic cushioning cylinder 94 in my co-pending application Serial No. 72,476 filed November 29, 1960 for Constant-Speed Reciprocable Hydropneumatic Motor, which on March 5, 1963 became U.S. Patent No. 3,079,897, and is shown particularly in FIGURE 2 thereof, of which FIGURE 7 herein a substantial reproduction. On channel members 54 are stops 130.

In the operation of the invention, let it be assumed that as shown in FIGURE 1 a vehicle 10, such as the railway freight car shown has been equipped with a pair of the cushioning installations 30 facing inwardly from adjacent the opposite end walls 14 thereof and that the movable end frames 48 are in the solid line positions shown in FIGURE 1. Let it also be assumed that the four hydropneumatic reciprocatory cushioning motors 94 have been charged with hydraulic and pneumatic fluid in the manner described above, with the hydraulic fluids in their chambers 114 and 116 and the pneumatic fluid in the chamber 112.

The shipper loads the racks 34 with the articles W to be shipped, places them on their respective platforms 40 and transports them into the chamber 32 of the freight car 10 by means of a fork lift truck or other suitable loading vehicle. When the freight car 10 has been loaded to its maximum capacity as shown in FIGURE 1, the doors (not shown) are closed in the usual manner and the freight car 10 is ready for travel, which for the purposes of example, will be assumed from left to right in the direction of the arrow at the top of FIGURE 1.

Let it be assumed that duirng such travel, the train to which the freight car 10 is coupled by means of the coupling 28 has been forced to apply its brakes suddenly, causing rapid deceleration or slowing down of the train and its various cars 10. The cargo, however, consisting of the racks 34 with their loads of articles W, by reason of its acquired momentum, continues to travel forward, moving the forward movable end frame 48 from its solid line position toward the dotted line position of FIGURE 1. As this occurs, the piston rod 98 connected to the movable end frame 48 by the head 68 and bracket 64 is forced toward the forward end wall 14 of the freight car 10, forcing the flow control valve 124 of each cushioning motor 94 to open and permit hydraulic fluid to flow at a controlled rate and constant speed from the main hydraulic chamber 116 into the intermediate hydraulic chamber 114 where it in turn causes the free piston 110 to move toward the piston rod head 92, further compressing the gas in the pneumatic chamber 112.

The foregoing cushioning action of the installation 30 produces a controlled deceleration of the movable end frame 48 of the cushioning installation 30 at the forward end of the freight car 10 or other vehicle as it passes from the solid line position to the dotted line position, preventing damage to the transported articles W constituting the cargo as the racks 34 carrying the articles W roll forwardly along the car floor 12 on their rollers or casters 42. Meanwhile, the vertical and horizontal rollers 74 and 78 of each cushioning device 50 move along their respective guideways 52 in rolling contact therewith (FIGURE 6), while the rounded ends of the cylinder head 90 and piston rod head 92 self-align themselves with their respective spherically-curved recesses 82 and 84.

When the deceleration of the freight car or other vehicle 10 has ceased, the pressure of the fluid compressed in the pneumatic chambers 112 of the cushioning motors 94 by the movement of the free pistons 110 therein causes the piston rods 98 thereof to move away from their respective cylinders 96, pushing the movable end frame 48 from its dotted line position of FIGURE 1 toward its solid line position, at the same time pushing the racks 34 and their carried articles W back to their original solid line positions.

During the travel of a train and particularly in switching freight cars from one train to another, or within a freight yard, the individual freight cars 10 are subjected to rapid acceleration and deceleration during backing as well as during forward travel. The rearwardly-located cushioning installation 30 in such instances provides a controlled deceleration when the cargo moves rearwardly in response to the rapid slowly down or halting of the freight car 10, in the manner similar to that described above for forward deceleration, but in the opposite direction.

While each platform or pallet 40 has been shown as equipped with casters or rollers 42 rolling directly upon the metal floor 12 of the freight car 10, it will be understood that the racks 34 may, if desired, be equipped with such rollers or casters 42 or provided with skids which slide directly upon the freight car floor 12. In the latter instance, the frictional engagement of the skids with the car floor 12 adds a retardation assisting the invention in cushioning the cargo during either acceleration or deceleration. Excessive acceleration and deceleration, for example, occurs during switching operations in freight yards.

What I claim is:
1. A shock-cushioning device for attachment to a cargo vehicle load-receiving body, said device comprising
 a fixed frame structure adapted to be relatively stationarily mounted in the vehicle load-receiving body adjacent one end thereof and having a longitudinally-extending guideway connected thereto,
 a movable frame structure mounted in relatively movable spaced relationship to said fixed frame structure,
  said movable frame structure being movably mounted in said guideway for travel toward and away from said fixed frame structure,
 and a hydropneumatic cushioning motor disposed between said structures and having a cylinder element connected to one of said structures and a main piston element with a main piston head reciprocable in said cylinder and with a hollow piston rod connected to the other of said structures,
  said cylinder element containing a cylinder bore constituting a main hydraulic fluid chamber and said hollow piston rod containing a rod bore with an auxiliary free piston reciprocable therein subdividing said rod bore into an intermediate hydraulic fluid chamber and a compressed pneumatic fluid chamber,
  said main piston element including valve means responsive to the attainment of a predetermined pressure within said motor for controlledly releasing hydraulic pressure fluid from said main hydraulic fluid chamber into said intermediate hydraulic fluid chamber.

2. A shock-cushioning device, according to claim 1, wherein said frame structures extend approximately from the bottom to the top of the load compartment and wherein a pair of said cushioning motors are connected between said structures near the opposite ends thereof in laterally-spaced relationship.

3. A shock-cushioning device, according to claim 2, wherein said pair of motors are disposed near the bottoms of said frame structures.

4. A shock-cushioning device, according to claim 2, wherein said pair of motors are disposed near the tops of said frame structures.

5. A shock-cushioning device, according to claim 1, wherein said structures extend approximately from the bottom to the top of the load compartment, wherein one pair of said cushioning motors are connected between said structures in laterally-spaced relationship near the opposite ends of the bottoms thereof, and wherein another pair of said cushioning motors are connected between said structures in laterally-spaced relationship near the opposite ends of the tops thereof.

6. A shock-cushioning device, according to claim 1, wherein said pressure fluid releasing valve means includes a spring-pressed valve in said main piston element controlledly opening communication between the opposite sides of said main piston element.

7. A shock-cushioning device, according to claim 1, wherein said pressure fluid releasing means includes a spring-pressed valve in said plunger element head controlledly regulating communication between the opposite sides of said plunger element head and wherein said main piston contains a constricted fluid passageway therethrough permitting constant restricted flow of hydraulic fluid therethrough.

References Cited in the file of this patent
UNITED STATES PATENTS

| | | |
|---|---|---|
| 1,085,285 | Monesmith | Jan. 27, 1914 |
| 2,963,175 | Thornhill | Dec. 6, 1960 |
| 3,035,827 | Peterson | May 22, 1962 |